(12) United States Patent
Dominique et al.

(10) Patent No.: US 7,894,514 B2
(45) Date of Patent: Feb. 22, 2011

(54) RECEIVER TECHNIQUES FOR WIRELESS COMMUNICATION

(75) Inventors: Francis Dominique, Rockaway, NJ (US); Laurence E. Mailaender, New York, NY (US); Reza Mardani, Bedminster, NJ (US); Francis Joseph Mullany, Castleknock (IE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1193 days.

(21) Appl. No.: 11/238,847

(22) Filed: Sep. 29, 2005

(65) Prior Publication Data

US 2007/0071070 A1 Mar. 29, 2007

(51) Int. Cl.
H03H 7/30 (2006.01)
H03H 7/40 (2006.01)
H03K 5/159 (2006.01)
(52) U.S. Cl. .................. 375/229; 375/231; 375/232
(58) Field of Classification Search ................. 375/227, 375/229–233, 224, 285, 350, 340, 267, 347, 375/349
See application file for complete search history.

(56) References Cited

U.S. PATENT DOCUMENTS

| 4,500,999 | A | * | 2/1985 | Takatori et al. ............. 375/236 |
| 4,792,915 | A | * | 12/1988 | Adams et al. ............... 708/322 |
| 5,222,101 | A | * | 6/1993 | Ariyavisitakul et al. ..... 375/231 |
| 5,283,531 | A | * | 2/1994 | Serizawa et al. ............ 329/316 |
| 5,319,585 | A | * | 6/1994 | Amrany ....................... 708/322 |
| 5,694,424 | A | * | 12/1997 | Ariyavisitakul .............. 375/233 |
| 5,909,384 | A | * | 6/1999 | Tal et al. ...................... 708/322 |
| 6,370,191 | B1 | * | 4/2002 | Mahant-Shetti et al. ..... 375/233 |
| 6,763,077 | B1 | * | 7/2004 | Saito et al. .................. 375/349 |
| 6,856,655 | B1 | * | 2/2005 | Garcia ......................... 375/326 |
| 6,901,243 | B2 | * | 5/2005 | Jayaraman et al. ......... 455/63.1 |
| 6,904,081 | B2 | * | 6/2005 | Frank .......................... 375/152 |
| 6,983,125 | B2 | * | 1/2006 | Smee et al. ................ 455/63.1 |
| 7,082,174 | B1 | * | 7/2006 | Smee et al. ................. 375/349 |
| 7,239,665 | B2 | * | 7/2007 | Mezer ......................... 375/257 |
| 7,317,747 | B2 | * | 1/2008 | Miyazaki et al. ............ 375/136 |
| 7,397,844 | B2 | * | 7/2008 | Smee et al. ................. 375/148 |
| 7,471,732 | B2 | * | 12/2008 | Tsatsanis .................... 375/267 |
| 7,535,980 | B2 | * | 5/2009 | Yang et al. .................. 375/350 |
| 2002/0196844 | A1 | * | 12/2002 | Rafie et al. .................. 375/232 |
| 2003/0087622 | A1 | * | 5/2003 | Jayaraman et al. .......... 455/307 |
| 2003/0101206 | A1 | * | 5/2003 | Graziano et al. ............ 708/277 |
| 2004/0042537 | A1 | * | 3/2004 | Frank .......................... 375/152 |

(Continued)

FOREIGN PATENT DOCUMENTS

JP 10163930 H 6/1998

*Primary Examiner*—Jean B Corrielus
(74) *Attorney, Agent, or Firm*—Carlson, Gaskey & Olds, P.C.

(57) ABSTRACT

A receiver device for use in a wireless communication system (20) includes a rake receiver (32) and an equalizer receiver (34). A controller (36) selects one of the rake receiver (32) or the equalizer receiver (34) for processing a received signal. In some situations, the rake receiver (32) will provide better performance. In other situations, the equalizer receiver (34) will provide better performance. One embodiment includes a plurality of equalizers (34A, 34B). One of the equalizers processes a data packet from a received signal while another one of the equalizers trains for processing a signal from a subsequent scheduled user. Another example embodiment includes controlling an equalizer length based on a delay span or another selected channel metric.

16 Claims, 2 Drawing Sheets

U.S. PATENT DOCUMENTS

| | | | |
|---|---|---|---|
| 2004/0165650 A1* | 8/2004 | Miyazaki et al. | 375/141 |
| 2004/0240531 A1* | 12/2004 | Black et al. | 375/148 |
| 2005/0078742 A1* | 4/2005 | Cairns et al. | 375/148 |
| 2005/0164644 A1* | 7/2005 | Shinoi et al. | 455/69 |
| 2005/0249274 A1 | 11/2005 | Larosa et al. | |
| 2006/0056496 A1* | 3/2006 | Smee et al. | 375/148 |
| 2006/0198433 A1* | 9/2006 | Molev-Shteiman et al. | 375/229 |
| 2006/0198434 A1* | 9/2006 | Chen et al. | 375/232 |
| 2006/0227908 A1* | 10/2006 | Scharf et al. | 375/346 |
| 2007/0049311 A1* | 3/2007 | Lindoff et al. | 455/515 |
| 2007/0060095 A1* | 3/2007 | Subrahmanya et al. | 455/343.1 |
| 2007/0217496 A1* | 9/2007 | Molev-Shteiman et al. | 375/229 |
| 2008/0279270 A1* | 11/2008 | Zeng | 375/231 |
| 2009/0207899 A1* | 8/2009 | Chen et al. | 375/231 |
| 2009/0219982 A1* | 9/2009 | Yang et al. | 375/231 |

* cited by examiner

RECEIVER TECHNIQUES FOR WIRELESS COMMUNICATION

FIELD OF THE INVENTION

This invention generally relates to telecommunications. More particularly, this invention relates to wireless communication systems.

DESCRIPTION OF THE RELATED ART

Wireless communication systems typically include a plurality of base stations strategically located to provide wireless communication coverage over a selected area or region. Each base station typically serves a cell that includes a plurality of sectors.

There are communications between a base station and a mobile station such as a cell phone in a downlink direction, which corresponds to signal transmissions from the base station to the mobile station. Communications also occur in an uplink direction including transmissions from the mobile station to the base station.

Achieving low-latency, internet-type data communications requires specially designed packet data channels. Systems that allow for data communications often include a scheduled uplink channel that is shared among various users. Different users will have different channel conditions depending on the location of the mobile station, a velocity of the mobile station and other understood factors. Accordingly, different users will have different burst rates on the scheduled uplink.

Typical arrangements for processing data signals transmitted on an uplink and received at a base station include using a rake receiver. As known, a rake receiver includes a technique that uses several baseband correlators to individually process several signal multipath components. The correlater outputs are combined to achieve improved communications, reliability and performance. While rake receivers have proven useful, they do have some limitations. For example, a user with very favorable pathloss conditions on an uplink may fail to achieve high burst rates. For such users, another type of receiver would provide better performance than a rake receiver.

An equalizer receiver can provide better performance in some such situations. Equalizer receivers have not been implemented in place of rake receivers, in part, because they do not out-perform rake receivers in all situations. For example, when a mobile station is moving at a high velocity, an equalizer receiver performance may be degraded and the rake receiver provides a better result.

A need for equalization in data communications has been recognized for some time. Equalization provides the advantage of improving bit error rates for links having substantial delayed dispersion in a wireless channel (e.g., a delay span similar to the symbol period or greater). For example, in the UMTS standard, an enhanced dedicated channel (E-DCH) for high speed data, the highest burst rate corresponds to 4 or 2 chips. This is a very short interval and typical urban channels have spans that equal or exceed this. Such channels can benefit from equalization. A variety of equalization techniques are known in the art.

There is a need for an improved receiver device and approach to processing received signals that allows for processing received signals in a manner that provides improved performance as often as possible.

SUMMARY OF THE INVENTION

This invention addresses the need for improved performance in processing received signals in a wireless communication system. Example embodiments include at least one of a combination of a rake receiver and an equalizer receiver that are selectively used depending on which of them provides better performance for a particular user, a plurality of equalizers such that one of them is training for adapting to a subsequently received signal while another one of them is processing a received signal or an equalizer having an adjustable equalizer length that is selectively adjusted responsive to a determined channel characteristic.

An exemplary method of communicating includes selecting one of a rake receiver technique or an equalizer receiver technique for processing a received signal.

Another exemplary method includes using a plurality of equalizers. One of the equalizers processes a received signal while another is trained for processing an expected signal.

Another exemplary method includes selectively controlling a length of an equalizer based upon a selected characteristic such as delay spread or mobile station speed. In one example, the filter length can be matched to the level of channel dispersion.

The various features and advantages of this invention will become apparent to those skilled in the art from the following detailed description. The drawings that accompany the detailed description can be briefly described as follows.

DETAILED DESCRIPTION

Figure 1:
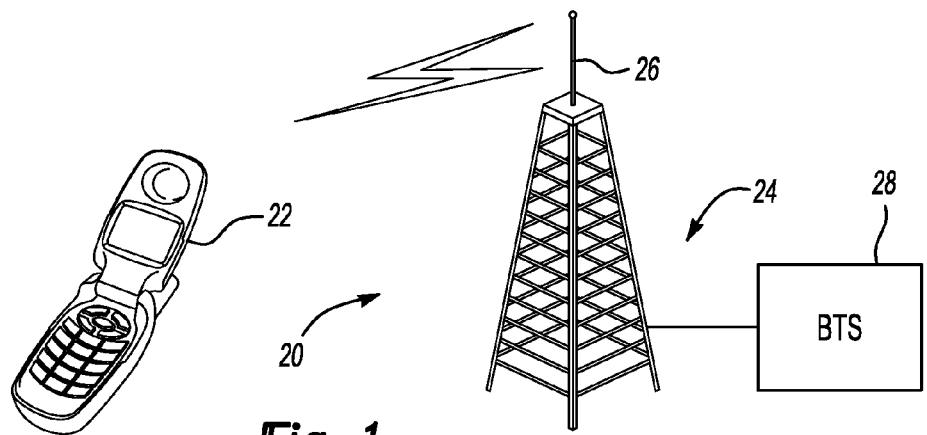
FIG. 1 schematically illustrates selected portions of a wireless communication system including an embodiment of this invention.

FIG. 1 schematically shows selected portions of a wireless communication system 20. A mobile station 22 communicates with a base station 24 in a generally known manner. The example base station 24 includes an antenna 26 and a base station transceiver (BTS) 28. One feature of the BTS 28 is a receiver device for processing signals received from the mobile station 22 on an uplink. An example receiver device is capable of processing high speed packet data signals communicated on an appropriate uplink channel.

Figure 2:
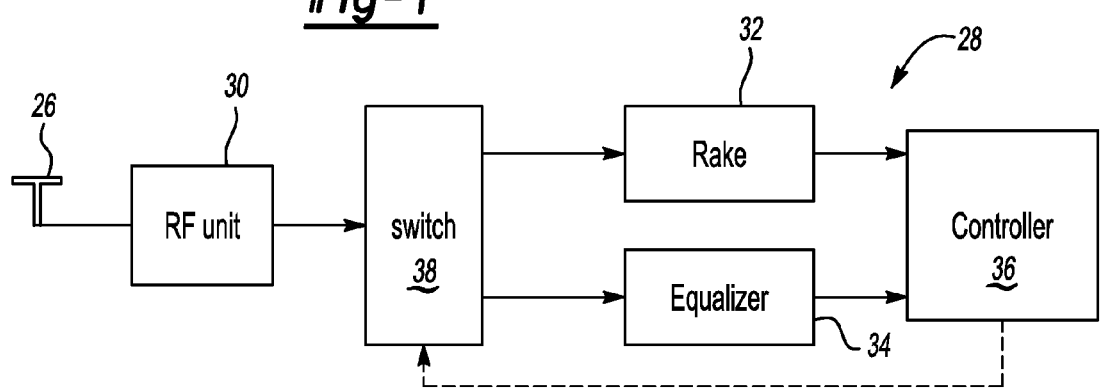
FIG. 2 schematically illustrates selected portions of a receiver device designed according to one embodiment of this invention.

FIG. 2 schematically shows one example receiver device. In this example, an RF unit 30 operates in a known manner for extracting and down-converting signals received at the base station 24, which have been transmitted by mobile stations, for example. The illustrated example includes a rake receiver 32 and an equalizer receiver 34. Each of the example receivers works in a known manner. A controller 36 selects between the rake receiver 32 and the equalizer receiver 34 for processing a received signal. The controller 36 uses at least one characteristic of a received signal or a user transmitting a received signal for selecting one of the receivers 32 or 34 for processing the received signal. The illustrated example includes a switch 38 that the controller 36 controls to dictate which of the receivers will be used for processing a received signal.

This description refers to a "received signal" to generically describe a signal received at the base station, for example.

There are some instances within this description where the "received signal" has not yet been received although it is referred to as a received signal in such instances.

In one example, the controller 36 considers a pilot channel associated with the received signal for determining which of the two receivers to select for processing the received signal. In one example, a pilot channel is analyzed prior to actual receipt of the received signal. The controller has information regarding incoming signals based upon a high speed packet data channel scheduling algorithm, for example, and uses such information for identifying an appropriate pilot signal.

In one example, the controller 36 processes a received pilot channel using the rake receiver 32 and determines an associated error energy. In one example, the known pilot symbols are subtracted from the output of the rake receiver 32. The difference is then squared to provide an indication of the error energy. The controller 36 performs the same process using the equalizer receiver 34. Whichever of the two receivers has a lower resulting error energy, in one example, is selected for processing the received signal (e.g., a high speed packet data signal on the uplink).

This example provides the advantage of utilizing an equalizer receiver 34 whenever that will provide enhanced performance for a user. One example includes preferring the equalizer receiver 34 over the rake receiver 32 and using the former whenever possible. There are situations where an equalizer receiver performance will be degraded because the mobile station is moving at a high velocity, for example. In those circumstances, the rake receiver 32 provides reliable performance. Accordingly, the disclosed example has the advantage of improving the performance for a user without sacrificing drawbacks associated with any particular type of receiver. The advantages of each receiver technique can be exploited with the disclosed example.

One example includes an adaptive equalizer receiver 34. One example equalizer receiver uses an equalization technique that provides for adaptive equalization. One example includes a least-mean-square (LMS) algorithm that uses a reference signal for training the equalizer to channel conditions. Other examples include known algorithms such as RLS, fast RLS or square-root RLS. For the adaptive aspect of the equalizer receiver to work, some information regarding a control signal associated with a received signal is used to adapt the equalizer receiver to the appropriate signal.

Figure 3:
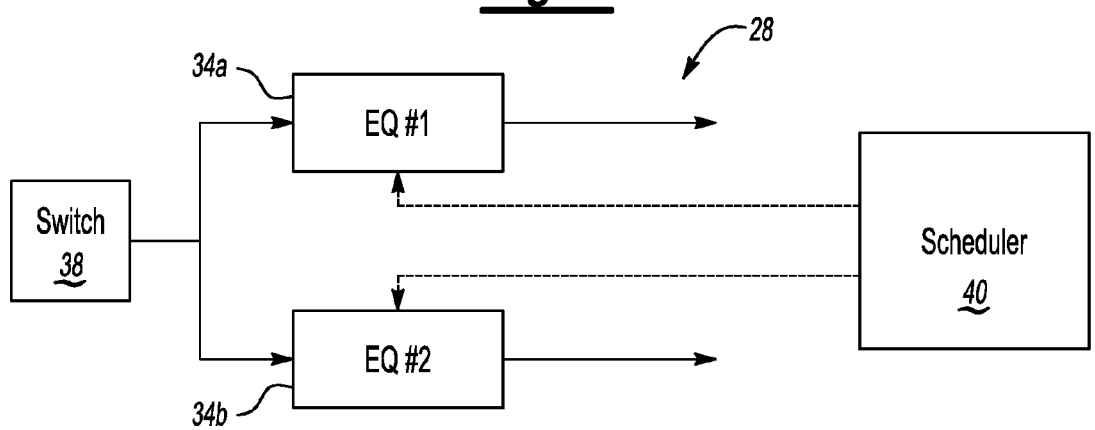
FIG. 3 schematically illustrates a selected feature of one example embodiment.

FIG. 3 schematically shows an arrangement including a plurality of equalizers. Such an arrangement accounts for packet-switched traffic, for example. The time required for equalizer training may be significant compared to packet duration in some situations.

Figure 5:
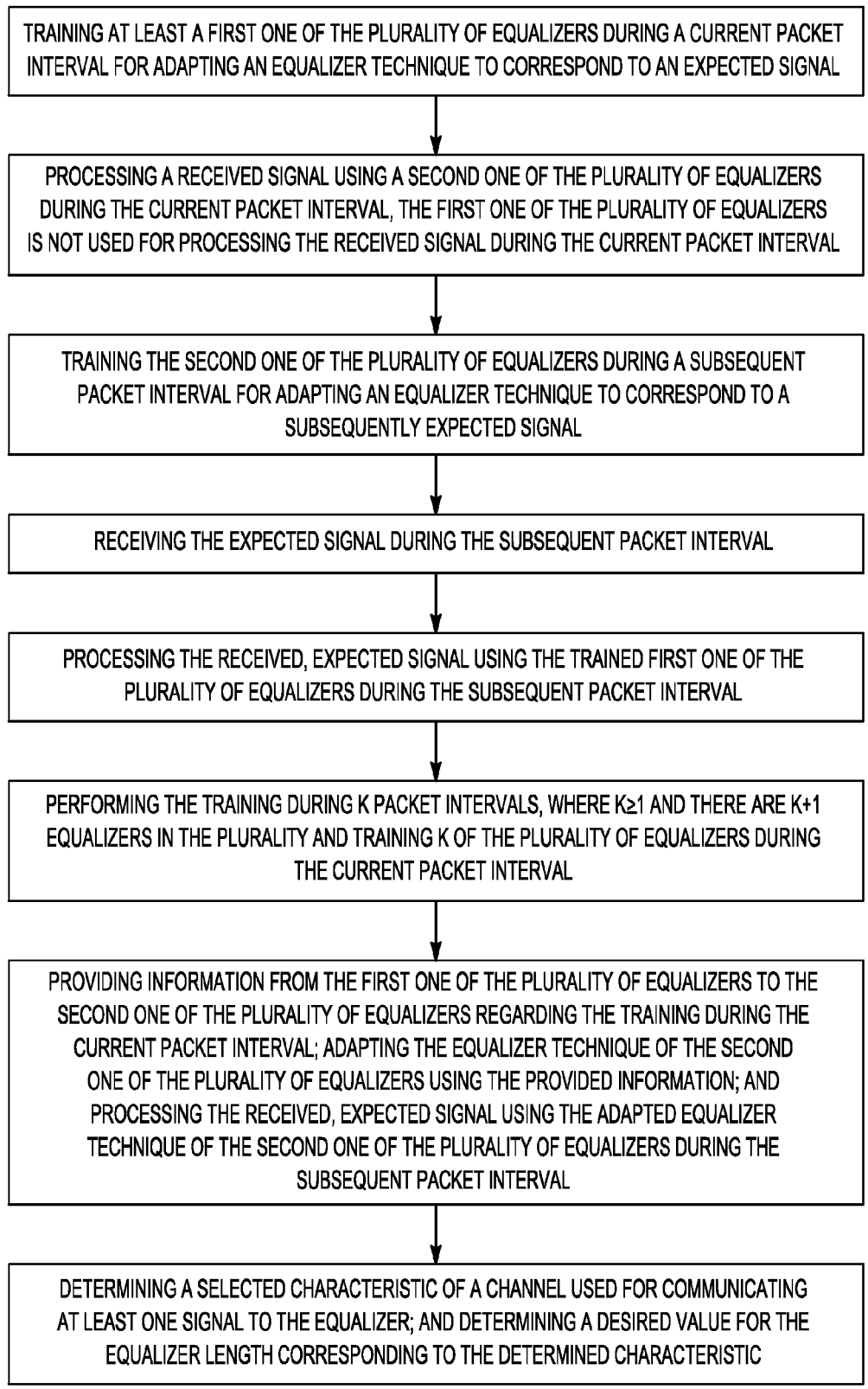
FIG. 5 is a flowchart diagram summarizing one example approach.

One embodiment, as summarized in the flowchart diagram of FIG. 5, includes using one equalizer for training while using another equalizer for processing received data packets. The equalizer in training shares information with the other equalizer, which is used for processing the received data packets. Considering the example of FIG. 3, a first equalizer receiver 34A includes an adaptive algorithm that processes a pilot channel signal from a scheduled user. In one example, the first equalizer receiver 34A detects the pilot signal during a period after a scheduler 40 has scheduled a particular user for an uplink transmission but prior to the transmission of a data packet by the user. The first equalizer receiver 34A utilizes the pilot signal from that user to train the equalizer according to the adaptive algorithm of that receiver. In one example, while the equalizer receiver 34A trains for one user, a second equalizer receiver 34B processes a received signal containing data packets from a previously scheduled user.

At a time corresponding to actual transmission of the received signal from the scheduled user, information from the first equalizer receiver 34A is provided to the second equalizer receiver 34B, which then processes the actual received signal. In one example, the exchanged information includes computed tap weights that are used as part of the adaptive algorithm within the equalizer receivers. Such an arrangement allows for the necessary training time required for an equalizer receiver to be appropriately adapted to a received signal.

In one example, the second equalizer receiver 34B is a programmable and fixed (i.e., non-adaptive) receiver that is reprogrammed each time information is provided to it by the first equalizer receiver 34A. In another example, the second equalizer receiver 34B is adaptable during the transmission of the received signal to further customize the performance of the receiver. In one example, the second equalizer receiver 34B adapts its performance during receipt of the received signal based upon the pilot signal used by the receiver 34A, another available control signal that is continuously available or a special control signal that accompanies the packet data burst of the received signal. The illustrated example allows for training an adaptive equalizer receiver in a manner that does not interfere with efficient signal processing at the receiver.

In another example, the equalizers do not share information and each trains independently of the other(s) to prepare for receiving a scheduled user's signal. Again considering the illustration of FIG. 3, the equalizer 34A is equalizing and processing a data packet from a received signal. At the same time, the equalizer 34B is training to the next scheduled user's signal using, for example, the pilot from the next scheduled user. During the subsequent packet interval, the equalizer 34B equalizes and processes that user's data packet. At that time, the equalizer 34A begins to train to the subsequently scheduled user's packet, again using a pilot signal for example.

These examples show how a plurality of equalizers can be used with at least one equalizing while at least one other trains for processing (i.e., equalizing) a scheduled but not yet received packet.

While the illustration in FIG. 3 includes two equalizers, some embodiments include more. For example, in some instances it will take longer than one packet interval for an equalizer to train to a user's signal. In one example it requires K packet intervals to train to a packet. In that example, K+1 equalizers are provided to allow sufficient training time without introducing processing delays.

In one such example, training for a scheduled user's transmission begins K packet intervals prior to the scheduled transmission. In one example, the scheduler 40 schedules a user during a current packet interval for transmission K intervals later and the training of a selected one of the equalizers begins in the current interval.

In examples where there are N users scheduled in a packet interval, the number of equalizers is multiplied by N. For example, when K+1 equalizers are used, N(K+1) equalizers are used when there are N users scheduled in a packet interval.

One significant advantage to such an arrangement is that it significantly reduces the amount of hardware and processing required if N(K+1) is significantly less than the number of users that are active in the cell. The example multiple equalizer arrangement removes a need to have a base station equalizer for each and every user in the system. This provides significant material savings and reduces power consumption. Considering an E-DCH in 3GPP, for example, the mix of mobility, packet duration and typical equalizer design will usually allow for a system designed according to this invention to have K=1 and N=1 or 2. If there are more than a few mobile stations currently using the E-DCH mode of operation, the disclosed examples provide significant savings because it significantly reduces the number of equalizers otherwise required.

Figure 4:
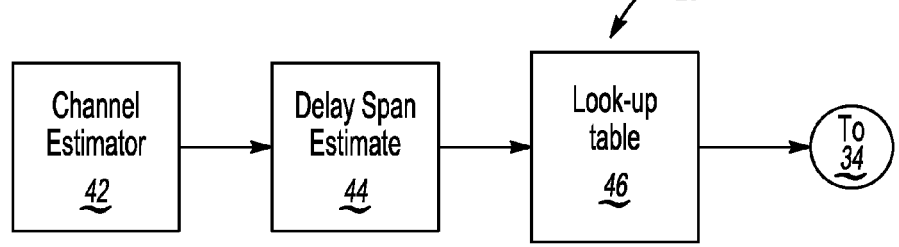
FIG. 4 schematically illustrates another feature of one example embodiment.

Some situations require an equalizer filter having one length while other situations require a different equalizer filter length. The example shown in FIG. 4 provides the ability to use different equalizer filter lengths as needed. A channel estimator portion 42 uses known searching techniques to discern a channel impulse response. In one example, the channel impulse response is used to determine a delay span, RMS delay spread or another metric such as channel coherence time, which is related to a mobile station's speed of movement. The illustrated example includes a delay span estimator portion 44 that uses information regarding the channel impulse response to determine a delay span or delay dispersion. In one example, the determined delay span is an estimated delay span. A lookup table 46 includes a predetermined plurality of equalizer filter lengths corresponding to different determined or estimated delay spans or another selected metric. One example includes performing simulations to determine a priori appropriate filter values for the lookup table 46. Once the channel delay span has been determined, an appropriate filter length is selected from the lookup table and used for the equalizer receiver for processing the received signal.

One advantage to the example of FIG. 4 is that it allows for customizing the length of an equalizer filter. It is known that as the length of a channel delay dispersion increases, longer filter lengths are required. Longer filters, however, can introduce drawbacks such as increased power consumption and computational complexity. Moreover, longer filters tend to introduce difficulties when tracking fast moving mobile stations. The adaptive approach of FIG. 4 allows for using a filter that is as short as possible for a given channel condition.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating using a plurality of equalizers, comprising:
   training at least a first one of the plurality of equalizers during a current packet interval for adapting an equalizer technique to correspond to an expected signal; and
   processing a received signal using a second one of the plurality of equalizers during the current packet interval, the first one of the plurality of equalizers is not used for processing the received signal during the current packet interval.

2. The method of claim 1, comprising
   training the second one of the plurality of equalizers during a subsequent packet interval for adapting an equalizer technique to correspond to a subsequently expected signal;
   receiving the expected signal during the subsequent packet interval; and
   processing the received, expected signal using the trained first one of the plurality of equalizers during the subsequent packet interval.

3. The method of claim 1, comprising
   performing the training during K packet intervals, wherein K≧1 and there are K+1 equalizers in the plurality; and
   training K of the plurality of equalizers during the current packet interval.

4. The method of claim 1, comprising
   providing information from the first one of the plurality of equalizers to the second one of the plurality of equalizers regarding the training during the current packet interval;
   adapting the equalizer technique of the second one of the plurality of equalizers using the provided information; and
   processing the received, expected signal using the adapted equalizer technique of the second one of the plurality of equalizers during the subsequent packet interval.

5. The method of claim 1, comprising at least one of
   adapting the equalizer technique of the second one of the plurality of equalizers prior to the current packet interval; or
   adapting the equalizer technique of the second one of the plurality of equalizers during the current packet interval.

6. The method of claim 1, wherein at least one of the plurality of equalizers has an equalizer length, the method comprising
   determining a selected characteristic of a channel used for communicating at least one signal to the at least one equalizer; and
   determining a desired value for the equalizer length corresponding to the determined characteristic.

7. The method of claim 2, comprising
   performing the training during K packet intervals, wherein K≧1 and there are K+1 equalizers in the plurality; and
   training K of the plurality of equalizers during the current packet interval.

8. The method of claim 2, comprising
   providing information from the first one of the plurality of equalizers to the second one of the plurality of equalizers regarding the training during the current packet interval;
   adapting the equalizer technique of the second one of the plurality of equalizers using the provided information; and
   processing the received, expected signal using the adapted equalizer technique of the second one of the plurality of equalizers during the subsequent packet interval.

9. The method of claim 2, comprising at least one of
   adapting the equalizer technique of the second one of the plurality of equalizers prior to the current packet interval; or
   adapting the equalizer technique of the second one of the plurality of equalizers during the current packet interval.

10. The method of claim 2, wherein at least one of the plurality of equalizers has an equalizer length, the method comprising
    determining a selected characteristic of a channel used for communicating at least one signal to the at least one equalizer; and
    determining a desired value for the equalizer length corresponding to the determined characteristic.

11. The method of claim 4, comprising
    training the second one of the plurality of equalizers during a subsequent packet interval for adapting an equalizer technique to correspond to a subsequently expected signal;
    receiving the expected signal during the subsequent packet interval; and
    processing the received, expected signal using the trained first one of the plurality of equalizers during the subsequent packet interval.

12. The method of claim 4, comprising performing the training during K packet intervals, wherein K≧1 and there are K+1 equalizers in the plurality; and training K of the plurality of equalizers during the current packet interval.

13. The method of claim 4, comprising at least one of adapting the equalizer technique of the second one of the plurality of equalizers prior to the current packet interval; or adapting the equalizer technique of the second one of the plurality of equalizers during the current packet interval.

14. The method of claim 4, wherein at least one of the plurality of equalizers has an equalizer length, the method comprising determining a selected characteristic of a channel used for communicating at least one signal to the at least one equalizer; and determining a desired value for the equalizer length corresponding to the determined characteristic.

15. A method of communicating, comprising:

processing a received signal using a first one of a plurality of equalizers;

training a second one of the plurality of equalizers during a time when the first one of the plurality of equalizers is processing the received signal, the first one of the equalizers being the only one of the two equalizers that processes the received signal;

processing a subsequently received signal using the second one of the equalizers;

training the first one of the equalizers while the second one of the equalizers processes the subsequently received signal, the second one of the equalizers being the only one of the two equalizers used for processing the subsequently received signal.

16. The method of claim 15, wherein the scheduler alternates each of the two equalizers between processing a received signal and training responsive to each subsequently received signal.

* * * * *